Nov. 6, 1934. W. L. PETERS ET AL 1,980,143
METHOD AND PROCESS OF FORMING HOLLOW ARTICLES
Filed Dec. 7, 1931 2 Sheets-Sheet 1
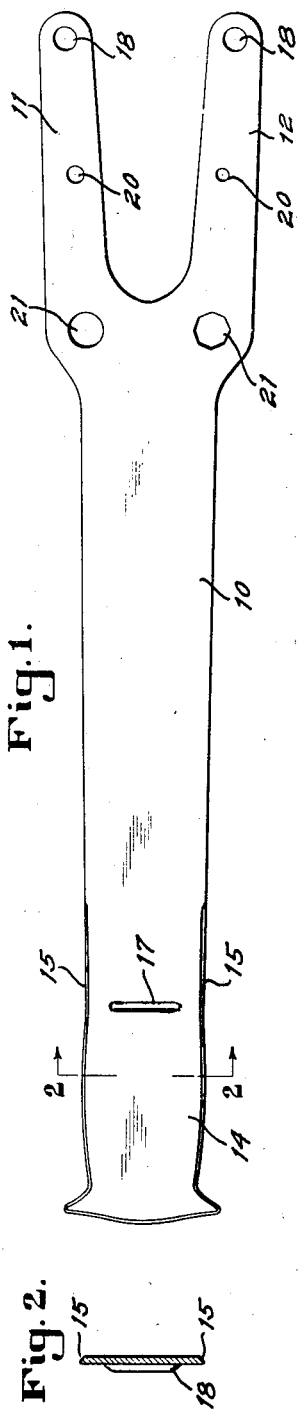
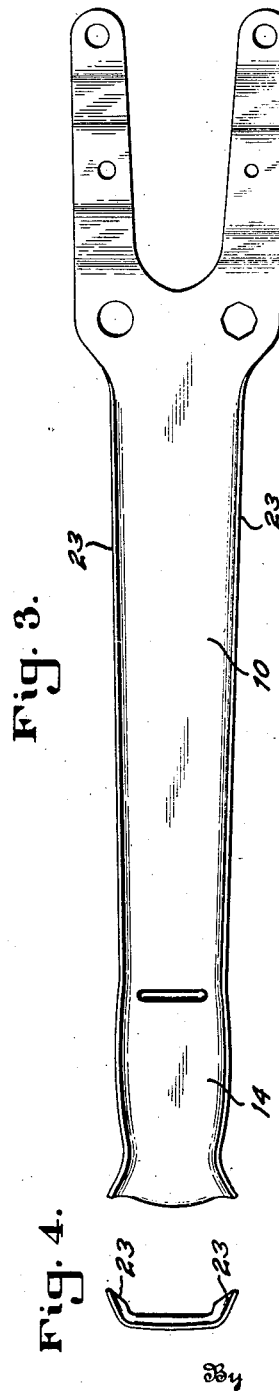
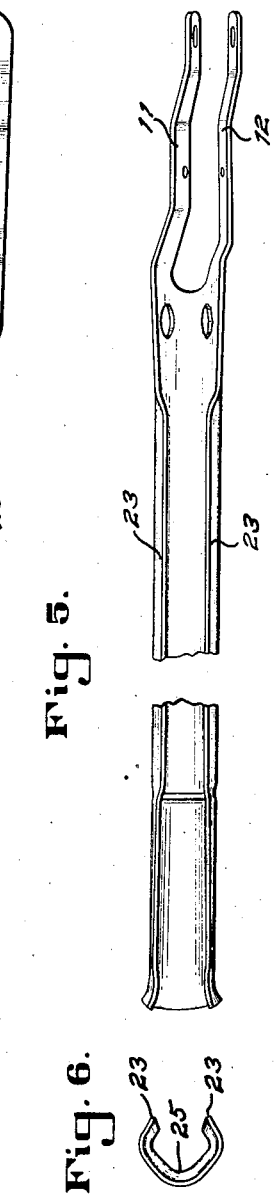
Inventor
William L. Peters
David R. Feemster
William H. Schomburg
Braselton, Whitcomb & Davies
Attorney Nov. 6, 1934. W. L. PETERS ET AL 1,980,143
METHOD AND PROCESS OF FORMING HOLLOW ARTICLES
Filed Dec. 7, 1931 2 Sheets-Sheet 2
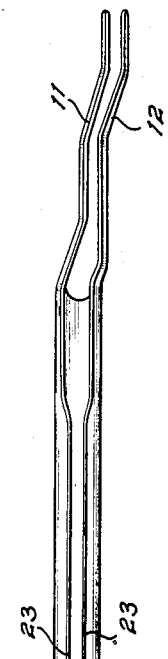
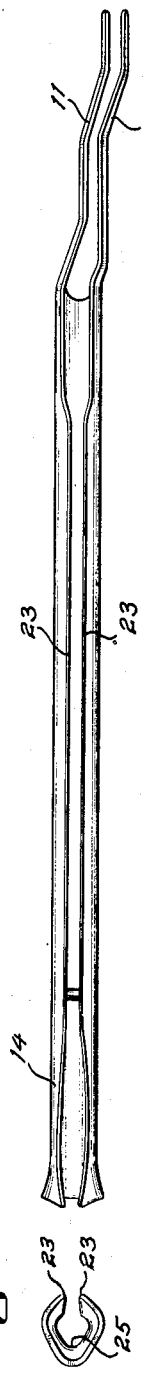
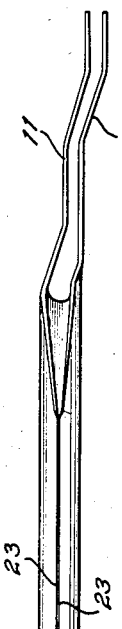
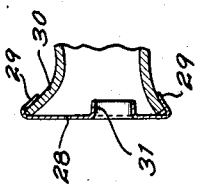
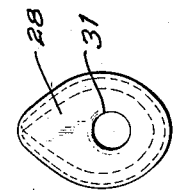
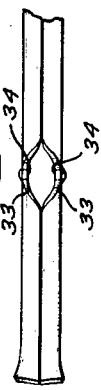
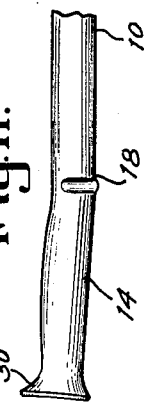
Inventor
William L. Peters
David R. Feemster
William H. Schomburg
By Braselton, Whitcomb Davies
Attorney Patented Nov. 6, 1934

1,980,143

UNITED STATES PATENT OFFICE 1,980,143

METHOD AND PROCESS OF FORMING HOLLOW ARTICLES

William L. Peters, David R. Feemster, and William H. Schomburg, Toledo, Ohio, assignors to The Bingham Stamping & Tool Company, Toledo, Ohio, a corporation of Ohio Application December 7, 1931, Serial No. 579,374

5 Claims. (Cl. 113—116)

This invention relates to a process and method for producing hollow or tubular members from sheet material and pertains more particularly to the method and process for producing a hollow lever.

The invention comprehends a process involving novel steps in performing operations upon a sheet of material to form a hollow lever construction.

The combination embraces a series of steps whereby a flat sheet of material is formed into a tubular configuration whereby the adjacent or joining edges of the sheet in formed configuration are caused to be brought into close engagement producing a substantially closed tubular structure without the utilization of welding or other metallic intermolecular closure or junctional formation.

The invention comprehends a process of this character for forming hollow constructions wherein the resulting juncture or seam occurring at the point of engagement of the formed edges of the structure is substantially unnoticeable and wherein a finished appearance is given to the article without the use of welding or juncture forming means.

A further object of the invention is the utilization of a novel and unique process and method for forming a tubular construction from a sheet of material wherein the formation or configuration operations are reduced to a minimum thus substantially decreasing the cost of producing tubular constructions.

Further objects and advantages are within the scope of this invention such as relate to the arrangement, operation and function of the related portions of the structure, to various details of construction and to combination of parts, elements per se, and to economies of manufacture and numerous other features as will be apparent from a consideration of the specification and drawings of a form of the invention, which may be preferred, in which:

Figure 1 is a plan view of a flat strip of material blanked to a predetermined configuration;

Figure 2 is a detailed sectional view taken substantially on a line 2—2 of Figure 1;

Figure 3 is a view similar to Figure 1 showing certain edges of the blank flanged or formed illustrating one step in the method and process of my invention;

Figure 4 is an end view of the parts shown in Figure 3;

Figure 5 is a view showing a further step in the formation process;

Figure 6 is an end view of the parts shown in Figure 5;

Figure 7 illustrates a further formation or step in the method and process of forming the tubular article;

Figure 8 is an end view of the parts shown in Figure 7;

Figure 9 illustrates the article after the final closing operation.

Figure 10 is an end view of the closed tubular article illustrated in Figure 9;

Figure 11 is a side view of the grip portion of the lever illustrated in Figure 9;

Figure 12 is an enlarged fragmentary detailed sectional view illustrating one end of the hollow lever and the method of securing a cover or closure to the end thereof;

Figure 13 is an end view of the parts shown in Figure 12;

Figure 14 is a fragmentary detail view of a portion of a lever showing a modified form produced through the utilization of the process of my invention;

Figure 15 is another view of the part illustrated in Figure 14.

We have shown our invention as utilized in producing and forming a lever member of hollow or tubular construction, but it is to be understood that we contemplate the use of the process of the invention in the formation of various hollow articles, such for example, as hollow shafts, cylinders, handles and the like.

Referring to the drawings in detail, Figure 1 illustrates the appearance or contour of a substantially flat strip of material resulting from the first step in carrying out the process and method of our invention as applicable to producing a substantially finished lever illustrated in Figures 9, 10 and 11. The blank illustrated in Figure 1 consists of a body portion 10 one end being bifurcated to form the furcations 11 and 12, the other end of the blank having an irregular formation 14 which afterwards becomes a handle or grip portion of the lever. After the blanking operation the edges of the portion of the lever 14 are swaged as particularly illustrated in Figures 1 and 2 at 15. Spaced from the grip end of the lever is a transversely positioned depressed portion 17 which forms a rib 18 upon the reverse face of the blank for a purpose to be hereinafter explained. This rib 18 is preferably impressed into the blank at the time of the blanking operation although it may be impressed by means of a separate operation. The furcations of the other extremity of the blank are provided with openings 18, 20 and 21, these openings being preferably punched out of the blank, the purpose of which will be hereinafter explained.

Figures 3 and 4 illustrate the blank 10 of Figure 1 disclosing the formation of the blank after the intitiation of the next step in the process which involves a preliminary bending or formation of the opposed edges of the body portion 10 and handle portion 14 of the lever blank forming flanges 23. These figures illustrate the first forming or bending operation in the production of the hollow lever construction.

Figures 5 and 6 illustrate the configuration of the article after the completion of a further step in bending the body and handle or grip portions of the lever member whereby the flange portions 23 have been brought closer together, this bending operation imparting a curvature 25 to the central portion of the lever body. In this step of the process, the furcations 11 and 12 which provide the means for support and operative connections of the lever member are brought into more close relation as illustrated particularly in Figure 5.

Figures 7 and 8 illustrate a further step in the process of hollow lever formation of my invention wherein the flanges 23 are brought closer together by further bending at the point of curvature 25 of the body portion. The furcations 11 and 12 have also been brought closer together in this step in the process.

Figures 9 and 10 illustrate the hollow formation of the lever after the last bending operation in the process of closing the adjacent edges of the blank, the cross sectional contour of the finished lever body being of substantially eliptical configuration. In these figures, the flanges 23 have been brought substantially in close engagement and with respect to the grip or handle portion 14 of the lever formation, because of the prior step of swaging the edges 15 of this portion of the blank, the adjacent swaged edges become entirely closed as indicated by line 26 in Figure 9 so that the closure seam appears as a single line. The closure is effected entirely by a combined bending and closing operation of the process resulting in the formation indicated in Figures 9 and 10 with the body and grip portions of the lever in closed relationship and the furcations 11 and 12 of the opposite end of the lever into substantial parallelism. Figure 11 illustrates a side view of the grip portion of the lever showing the resulting position of the rib 18 formed out of the blank in the first step of the process illustrated in Figures 1 and 2, this rib serving in the finished article to effect a visual separation of the grip portion 14 from the body portion 10 of the finished lever. The resulting juncture of the edges of the blank is very close especially the swaged edges of the grip portion so that the juncture line in the finished article is substantially unnoticeable, the construction being formed without the utilization of riveting, welding or other intermolecular joining means.

Figures 12 and 13 illustrate a further step in the process of lever formation wherein the open end of the grip portion of the lever is closed by means of a flanged cap 28 wherein the flanges 29 thereof are pressed or folded inwardly over the flared upper portion 30 of the grip portion of the lever thus presenting a neat and finished appearance of the grip portion and at the same time further strengthening the grip portion by reason of the flanged formation of the cap being in close engagement with the exterior walls of the end of the lever. In the particular embodiment of article resulting from the process of our invention, the cap 28 is provided with an opening 31 to accommodate a vertical rod (not shown) adapted to pass through the hollow central portion of the lever for operating releasing mechanism (not illustrated).

Figures 14 and 15 illustrate a modified formation of the grip portion of a lever generally similar to the form hereinbefore described which is carried out by substantially the same process hereinbefore described but wherein two ear portions 33 are formed just below the grip portion, and have openings 34 to receive a pin or other pivotal member which provides a means for supporting a bell crank mechanism release member (not shown) in the trade known as a "spoon" grip release member which in turn is connected adjacent the flanges 33 to a rod (not shown) adapted to pass downwardly through the hollow body portion of the lever.

It is apparent that, within the scope of the invention modifications and different arrangements may be made other than is herein disclosed, and the present disclosure is illustrative merely, the invention comprehending all variations thereof.

What we claim is:

1. The process of producing elongated hollow levers which consists in blanking a sheet of material to form a plurality of furcations at one end and a handle portion at the other end thereof, of swaging or tapering certain edges of the blank and of flanging and subsequently bending portions of said blank until the edges thereof are substantially in close engagement and the furcations in opposed parallel relation.

2. In the process for the producing of elongated hollow levers comprising a series of steps of cutting a sheet of material to form a plurality of furcations at one end and a handle portion at the other end thereof and of tapering certain edges of said sheet, of subsequently flanging opposed edges of said sheet and bending the sheet to form a substantially eliptical hollow portion wherein the adjacent edges are substantially closed and the furcations in opposed parallel relation.

3. In the process for the producing of hollow levers comprising a series of steps of cutting a sheet of material to predetermined configuration and of tapering certain edges of said sheet, raising a portion of the blank to form a rib of subsequently flanging opposed edges of said sheet and bending the sheet to form a hollow formation wherein the adjacent edges are substantially closed, and the raised portion defining the extent of a handle portion and of flanging a cap member over one end of said tubular formation.

4. The process of forming a lever which consists in cutting a sheet to a predetermined configuration of a body portion and a plurality of furcations at one end, raising a portion of the blank to form a rib of forming a plurality of ears adjacent said rib of subsequently flanging and bending the body portion to bring the opposed edges thereof into close engagement whereby the raised portion defines the extent of a handle portion and simultaneously bringing the furcations of one end of the member into substantial parallelism.

5. The process of forming a lever which consists in cutting a sheet to a predetermined configuration, of a body portion and a plurality of furcations at one end, of indenting a portion of the blank to form a raised rib of subsequently flanging and bending the body portion to bring the opposed edges thereof into close engagement to form a substantially eliptical hollow portion and simultaneously bringing the furcations of one end of the member into substantial parallelism, and whereby the indented portion defines the extent of a handle portion and of flanging a cap over the end of the tubular formation of the lever.

WILLIAM L. PETERS.
DAVID R. FEEMSTER.
WILLIAM H. SCHOMBURG.